(12) United States Patent
Bagepalli et al.

(10) Patent No.: US 8,506,250 B2
(45) Date of Patent: Aug. 13, 2013

(54) WIND TURBINE ROTOR BLADE WITH TRAILING EDGE EXTENSION AND METHOD OF ATTACHMENT

(75) Inventors: Bharat Bagepalli, Niskayuna, NY (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/276,560

(22) Filed: Oct. 19, 2011

(65) Prior Publication Data

US 2012/0134817 A1 May 31, 2012

(51) Int. Cl.
*F01D 5/16* (2006.01)

(52) U.S. Cl.
USPC .......... 416/62; 416/228; 416/229 R; 416/230; 29/889.71

(58) Field of Classification Search
USPC ............... 416/228, 236 R, 237, 62, 229 R, 416/230; 29/889.7, 889.71, 889.21
See application file for complete search history.

(56) References Cited

U.S. PATENT DOCUMENTS

| RE19,412 | E |   | 1/1935  | Zaparka |
|---|---|---|---|---|
| 2,450,440 | A | * | 10/1948 | Mills .......................... 416/223 R |
| 3,528,753 | A | * | 9/1970  | Dutton et al. ................. 416/226 |
| 3,586,460 | A | * | 6/1971  | Toner ............................ 416/144 |
| 4,329,119 | A | * | 5/1982  | Baskin .......................... 416/226 |
| 4,626,172 | A | * | 12/1986 | Mouille et al. ............. 416/134 A |
| 5,088,665 | A | * | 2/1992  | Vijgen et al. .................. 244/200 |
| 5,346,367 | A | * | 9/1994  | Doolin et al. ................. 416/230 |
| 7,059,833 | B2 | * | 6/2006  | Stiesdal et al. .................. 416/41 |
| 7,458,777 | B2 | * | 12/2008 | Herr .................................. 416/23 |
| 7,637,721 | B2 | * | 12/2009 | Driver et al. ................... 416/224 |
| 2007/0065290 | A1 | * | 3/2007 | Herr ........................... 416/223 R |
| 2007/0077150 | A1 | * | 4/2007 | Llorente Gonzalez ... 416/223 R |
| 2009/0074585 | A1 | * | 3/2009 | Koegler et al. ................ 416/228 |
| 2010/0296940 | A1 | * | 11/2010 | Zuteck .......................... 416/226 |
| 2010/0296941 | A1 | * | 11/2010 | Zuteck .......................... 416/226 |
| 2011/0142635 | A1 | * | 6/2011 | Fritz ............................... 416/62 |
| 2011/0142668 | A1 | * | 6/2011 | Rao ........................... 416/229 R |
| 2011/0268558 | A1 | * | 11/2011 | Driver et al. ................... 415/119 |
| 2012/0027590 | A1 | * | 2/2012 | Bonnet ............................. 416/1 |

OTHER PUBLICATIONS

Co-Pending and Related U.S. Appl. No. 13/228,650, filed Sep. 9, 2011.

* cited by examiner

*Primary Examiner* — Edward Look
*Assistant Examiner* — William Grigos
(74) *Attorney, Agent, or Firm* — Dority & Manning, P.A.

(57) ABSTRACT

A wind turbine rotor blade assembly includes a rotor blade having a pressure side, a suction side, a leading edge, and a trailing edge extending in a generally span-wise direction between a tip and a root. An edge extension is attached along the trailing edge and includes a first strip member having a span-wise attachment section attached to pressure side, and a second strip member having a span-wise attachment section attached to the suction side. Each of the first and second strip members has an outboard edge and an extension section that projects chord-wise beyond the trailing edge. The extension sections are adhesively attached to each other outboard of the trailing edge along a span-wise length of the first and second strip members and define an adhesively bonded closure edge of the edge extension. A method is also provided for forming an edge extension on a wind turbine rotor blade.

13 Claims, 4 Drawing Sheets

WIND TURBINE ROTOR BLADE WITH TRAILING EDGE EXTENSION AND METHOD OF ATTACHMENT

FIELD OF THE INVENTION

The present disclosure relates in general to wind turbine rotor blades, and more particularly to a trailing edge extension for a wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Wind turbine blades are generally designed for an optimal wind speed and, thus, are less efficient at other wind speeds. Prior attempts to increase the effective range of wind speeds for the turbine blades have involved systems that modify or change the aerodynamic profile of the blade by the addition of active or passive appendages, flaps, or other control surfaces attached to the blades, particularly along the trailing edge of the blade.

In addition, an ongoing concern with modern wind turbines is the noise emitted during operation of the turbines, which can be considerable with larger wind turbines. A component of the noise is the result of interaction between the boundary layer air moving over the blade and the trailing edge of the blade. It is generally recognized that greater trailing edge thicknesses generate increased noise levels. It is known to attach trailing edge pieces to an existing blade to reduce the noise emitted by the blades.

Regardless of their intended function, existing trailing edge extensions are generally pre-formed with specific dimensions and contours for particular blade sizes. These extensions are, thus, relatively expensive to manufacture and an inventory of different sized extensions must be available. Once the devices are attached, they cannot be further shaped or contoured. The process for attaching these devices to existing blades is tedious and time consuming, and adds to the overall cost of wind turbine energy production.

Accordingly, an improved trailing edge extension for wind turbine blades and associated attachment method would be desired.

BRIEF DESCRIPTION OF THE INVENTION

Aspects and advantages of the invention will be set forth in part in the following description, or may be obvious from the description, or may be learned through practice of the invention.

In one embodiment, a wind turbine rotor blade assembly is provided and includes a rotor blade having a pressure side shell member, a suction side shell member, a leading edge, and a trailing edge extending in a generally span-wise direction between a tip portion and a blade root. An edge extension is attached along the trailing edge and includes a first strip member having a span-wise attachment section attached to the pressure side shell member, and a second strip member having a span-wise attachment section attached to the suction side shell member. Each of the first and second strip members has an outboard edge and an extension section that extends chord-wise beyond the trailing edge. The extension sections are adhesively attached to each other outboard of the trailing edge along a span-wise length of the first and second strip members, with the outboard edges of the strip members defining an adhesively bonded closure edge of the trailing edge extension.

The first and second strip members may be the same or a combination of different materials. In a particular embodiment, the strips members are adhesively-backed tape strips that are pliable and conformable along the trailing edge of the blade. The tape strips may, for example, be supplied in the form of tape rolls, wherein the strips are measured and cut from the rolls. The tape strips may have any desired thickness and width depending on any combination of factors, such as blade size, workability and rigidity of the materials, ease of application to the blade surfaces, and so forth.

The first and second strip members may be directly adhered to each other along the extension sections without intervening structural components. In other embodiments, however, it may be desired to include a stiffening strip member between the first and second strip members along the extension sections. This stiffening strip member may be, for example, a composite or plastic material that gives the edge extension a desired final degree of rigidity without a detrimental weight increase.

For embodiments that include the stiffening strip member, the member may be adhesively attached to the first and second strip members and unattached to the trailing edge. For example, the stiffening strip may be a single or double-sided adhesive strip that is placed between the extension sections of the first and second strip members prior to adhesively joining the strip members together. In an alternate embodiment, the stiffening strip member may include a plurality of pressure side attachment tabs and suction side attachment tabs that are spaced along an inboard edge thereof and attach directly to the pressure and suction side shell members of the blade.

In certain embodiments, any manner of noise-reduction structural members or features may be defined in the extension sections. For example, serrations may be defined along the outboard edges of the extension sections.

The present invention also encompasses various method embodiments for forming an edge extension on a wind turbine rotor blade, wherein the rotor blade has a pressure side shell member, a suction side shell member, a leading edge, and a trailing edge extending in a generally span-wise direction between a tip and a root. The method includes attaching a first strip member to the pressure side shell member along the trailing edge of the blade such that a span-wise section of the first tape member defines an extension section that projects chord-wise beyond the trailing edge, and attaching a second strip member to the suction side shell member along the trailing edge of the blade such that a span-wise section of the second tape member defines an extension section that projects chord-wise beyond the trailing edge. The respective extension sections of the first and second strip members are adhesively attached together (directly or indirectly) such that the outboard edges of the extension sections define a bonded closure edge.

In a particular embodiment, the method includes applying the strip members in the form of adhesively-backed tape strips, for example by cutting the strips to size from a roll of the tape, or from planar sheets of the tape material.

The method may include adhering the first and second strip members directly to each other along the extension sections without intervening structural components. In other embodiments, the method may include reinforcing the strip members, for example by placing a stiffening member between the first and second strip members.

Certain method embodiments may include any manner of finishing step to achieve a desired outboard edge contour along the edge extensions. For example, an outboard portion of the extension sections may be trimmed away to define the desired profile, which may include defining noise reduction features in the edge extension, such as a serrated profile.

The invention also encompasses any manner of wind turbine configuration having one or more rotor blades configured with an edge extension in accordance with aspects presented herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
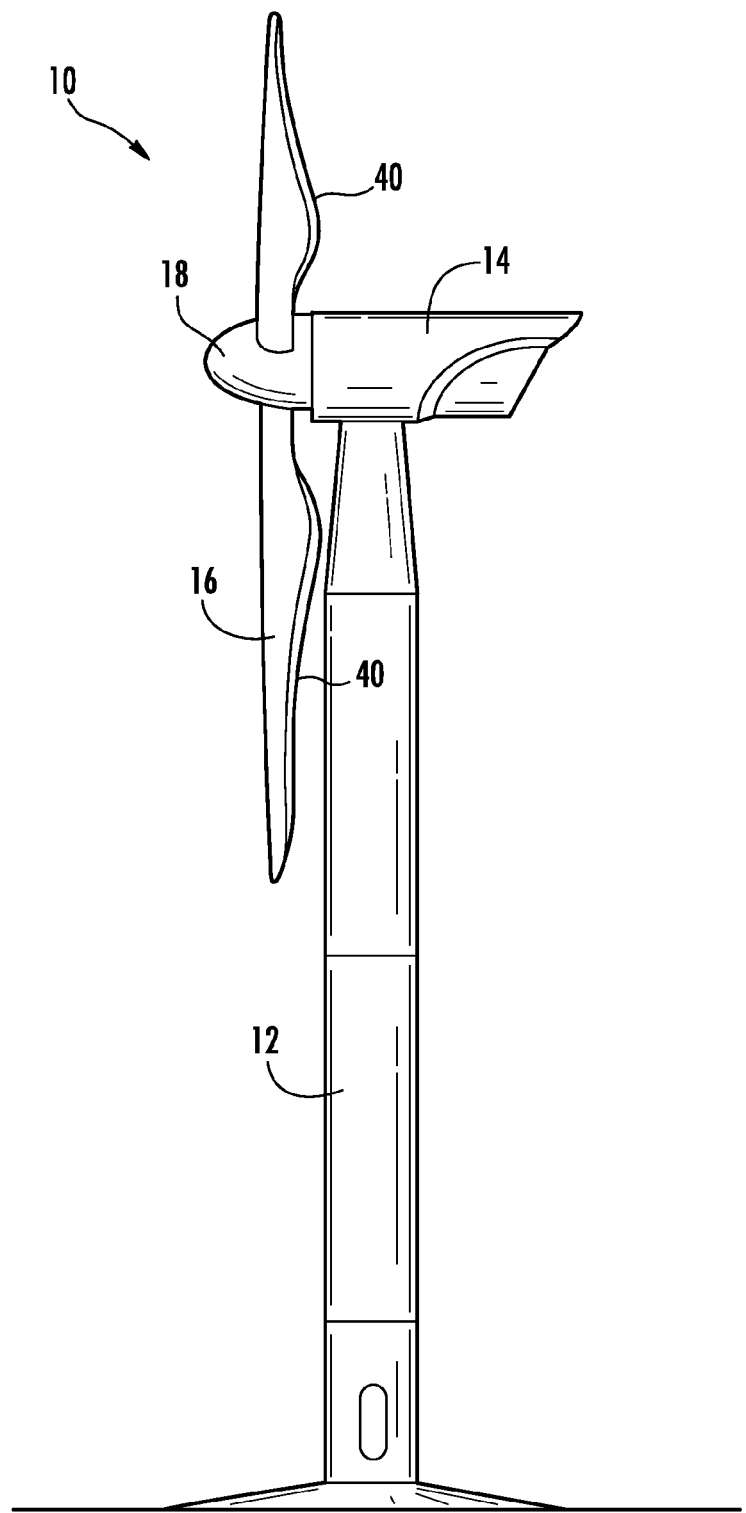
FIG. 1 is a perspective view of a wind turbine having one or more rotor blade assemblies that may incorporate an edge extension in accordance with aspects of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blade assemblies 16 with a trailing edge extension 40 in accordance with aspects of the present disclosure are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
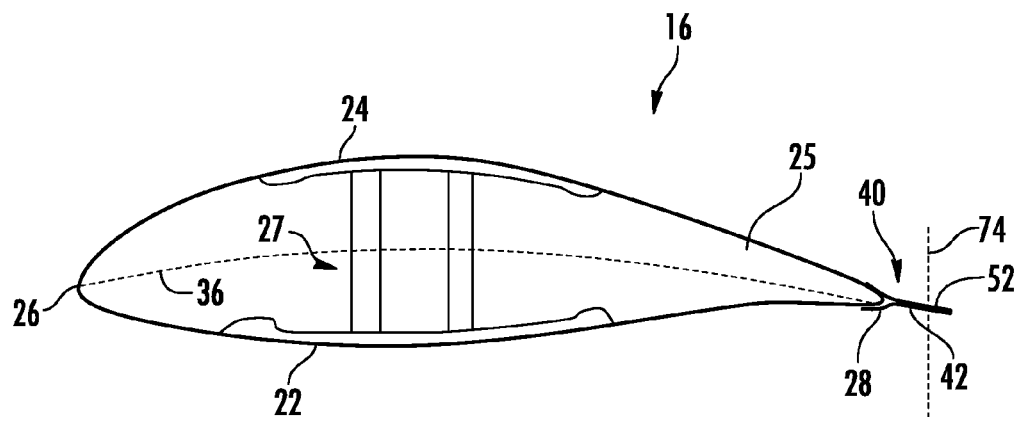
FIG. 2 is a cross-sectional view of a rotor blade with a trailing edge extension.
Figure 3:
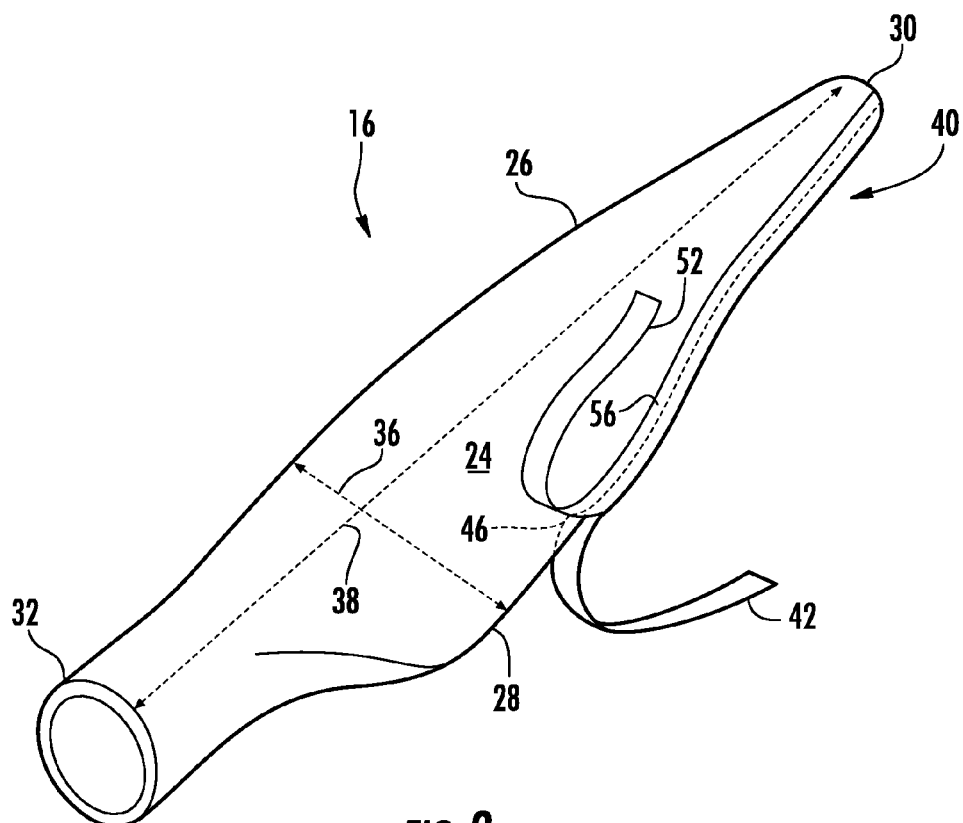
FIG. 3 is a perspective view of a wind turbine blade with trailing edge extension strip members.

Referring to FIGS. 2 and 3, aspects of a rotor blade assembly 16 include exterior surfaces defining a pressure side shell member 22 and a suction side shell member 24 extending between a leading edge 26 and a trailing edge 28. The blade 16 extends from a blade tip 30 to a blade root 32. The exterior surfaces may be aerodynamic surfaces having generally aerodynamic contours, as is generally known in the art. The shell members 22, 24 define an interior cavity 25 of the blade 16 in which any manner of internal support members 27 are located, such as spar caps, shear web, and the like.

In some embodiments, the rotor blade 16 may include a plurality of individual blade segments aligned in an end-to-end order from the blade tip 30 to the blade root 32. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade assembly 16 defines a chord-wise aspect 36 and a span-wise aspect 38, respectively, as illustrated in FIG. 3. The chord 36 may vary throughout the span 38 of the rotor blade 16. Thus, a local chord 36 may be defined for the rotor blade 16 at any point on the rotor blade 16 along the span 38.

Figure 4:
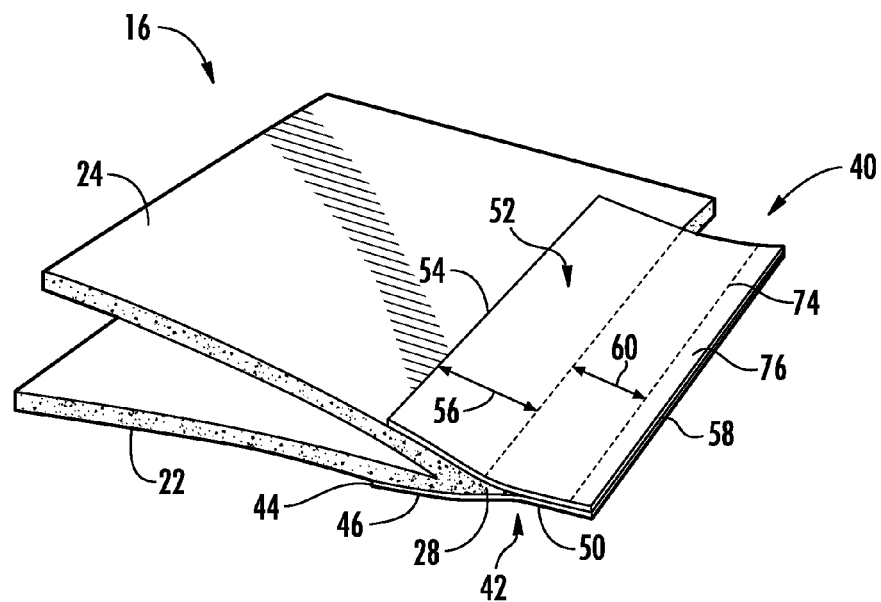
FIG. 4 is a partial perspective and cross-sectional view of a wind turbine blade with a trailing edge extension.

Referring to FIGS. 2 and 3, a rotor blade assembly 16 in accordance with aspects of the present disclosure includes an edge extension 40 attached along the trailing edge 28 of the blade. The edge extension 40 is configured as a first strip member 42 attached to the pressure side shell member 22, and a second strip member 52 attached to the suction side shell member 24. Referring to FIG. 4, the first strip member 42 has an attachment section 46 that is bordered by inboard edge 44. The attachment section 46 extends span-wise along the length of the strip member 42 and is attached by suitable means to the exterior surface of the pressure side shell member 22. For example, the attachment section 46 of the first strip member 42 may have an adhesive 62 (FIG. 5) applied thereto for direct attachment to the pressure side shell member 22. Likewise, the second strip member 52 includes an attachment section 56 bordered by the inboard edge 54. The attachment section 56 is adhered to the exterior surface of the suction side shell member 24, as particularly illustrated in FIG. 4.

Each of the respective strip members 42, 52 includes an extension section 50, 60 that projects in a chord-wise direction beyond the trailing edge 28 of the blade 16. These extension sections 50, 60 are adhesively attached to each other outboard of the trailing edge 28 along a span-wise length of the strip members 42, 52 such that the outboard edges 48, 58 of the respective strip members 42, 52 defining a bonded closure edge 64 (FIG. 5) of the trailing edge extension 40.

Figure 5:
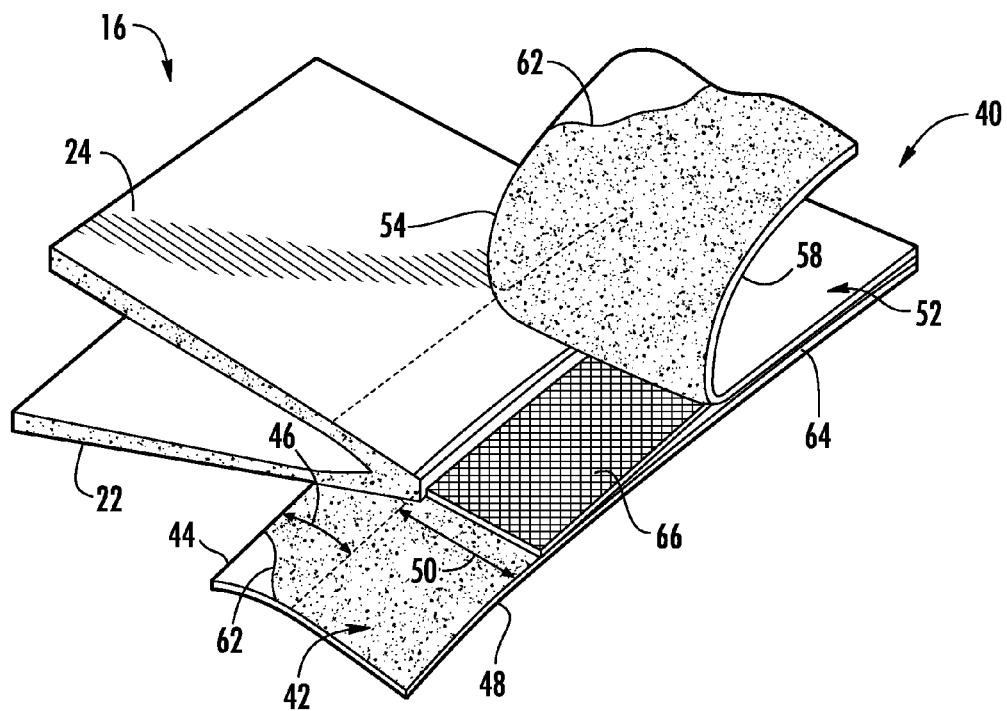
FIG. 5 is a partial perspective and cross-sectional view of an alternative embodiment of a wind turbine blade with a trailing edge extension.

Referring for example to FIGS. 4 and 5, the first and second strip members 42, 52 may be configured as adhesively-backed tape strips that have an adhesive layer 62 pre-applied to the tape strips. A removable backing layer may be applied over the adhesive layer 62 and removed prior to attachment of the tape strips to the shell members 22, 24. The tape strips may, for example, be supplied in a roll form (or other suitable means for transporting and storing tape), wherein the first and second strip members 42, 52 are measured and cut from the tape roll. In other embodiments, the first and second strip members 42, 52 may be cut from sheet material that may be shipped and stored in stacked form. The strip members 42, 52 are not limited by any particular type of material, and may be composed of any one or combination of materials that are pliable and conformable to the trailing edge 28 of the blade assembly 16. The materials for the tape members 42, 52 may be selected to have a desired thickness, rigidity, and characteristics to withstand the operating environment of a conventional wind turbine.

It should also be appreciated that the strip members 42, 52 need not be adhesively-backed, and that an adhesive may be applied (e.g., coated, sprayed, etc.) between the strip members 42, 52 during the attachment process.

In the embodiment of FIGS. 3 and 4, the first and second strip members 42, 52 are attached directly to each other along the extension sections 50, 60 without intervening structural components. In this embodiment, the strip members may simply be pressed together and adhered to each other via the respective adhesive layers 62. The strip members 42, 52 are selected in this embodiment to have a material characteristic and combined thickness so as to provide a desired rigidity to the resulting trailing edge extension 40, yet allow for conformability and ease of application of the individual strips.

Figure 6:
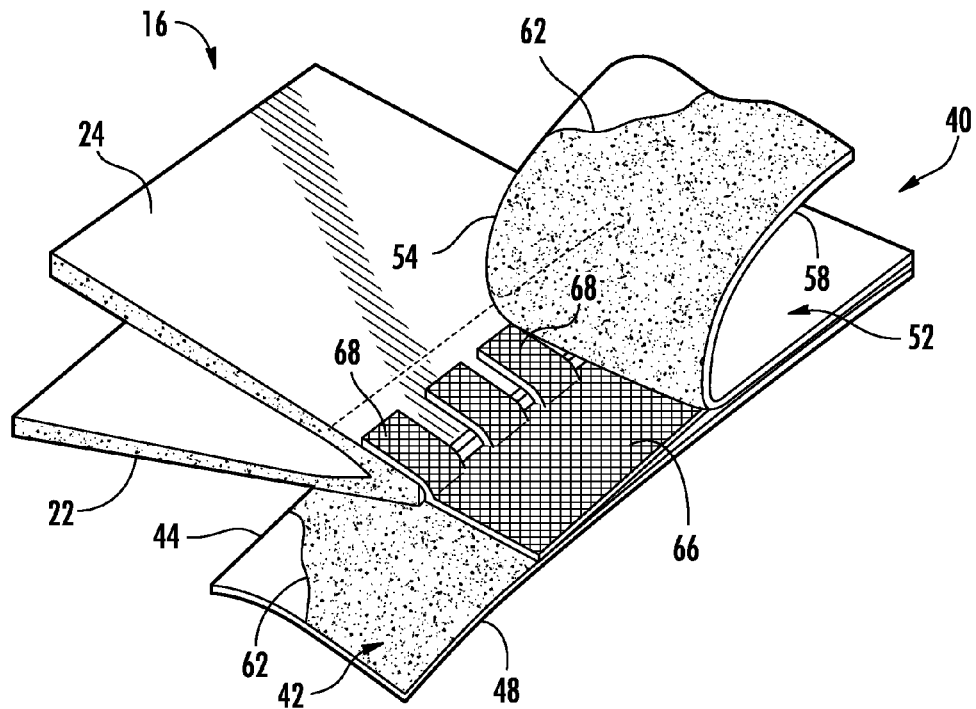
FIG. 6 is a partial perspective and cross-sectional view of another embodiment of a wind turbine blade with a trailing edge extension.
Figure 7:
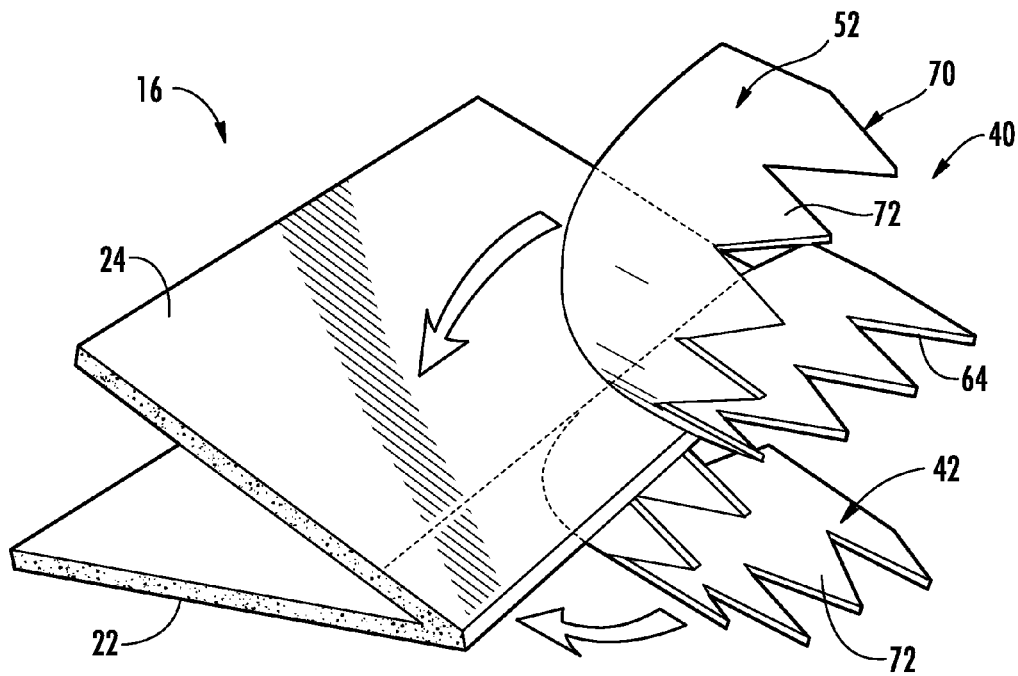
FIG. 7 is a partial perspective and cross-sectional view of yet another embodiment of a wind turbine blade with a trailing edge extension.

Referring to FIG. 5, it may, in certain embodiments, be desired to structurally reinforce the extension sections 50, 60 of the first and second strip members 42, 52. For example, any manner of stiffening element or strip member 66 may be disposed between the extension sections 50, 60 in the span-wise direction of the strip members 42, 52. This stiffening strip member 66 may be formed of any suitable material that provides a desired degree of rigidity to the extension sections 50, 60. For example, in a desirable embodiment, the strip member is formed from a fiber reinforced material having a multitude of crossed fibers, such as a glass fiber mat material. Referring to FIGS. 6 and 7, the individual fibers may be oriented at a 45° angle relative to the outboard edge 48 of the extension 40. This fiber configuration creates a "trellis effect" that allows for three-dimensional conforming of the stiffening strip member 66 to the blade and strip member contours without folding or bunching of the member 66 in the longitudinal aspect.

In the embodiment of FIG. 5, the stiffening strip member 66 is unattached to the blade shell members 22, 24 and is adhered to the adhesive layer 62 on each of the strip members 42, 52.

In the embodiment of FIG. 6, the stiffening strip member 66 is also attached to either or both of the suction or pressure side shell members 22, 24. For example, a plurality of spaced-apart attachment tabs 68 may be alternately defined along the span-wise length of the stiffening strip member 66, wherein the tabs 68 alternate between attachment to the pressure side shell member 22 and suction side shell member 24 (alternate tabs on the suction side shell member 24 are illustrated in FIG. 6). The tab 68 may have an adhesive applied to the underside thereof for attachment to the shell members.

Referring to FIGS. 2 and 4, it should be appreciated that the first and second strip members 42, 52 may have a chord-wise width that allows for trimming and sculpting of the trailing edge extension 40 along the span-wise length of the blade. For example, any portion 76 of the adhered extension sections 50, 60 may be trimmed along a trim line 74 so that the outboard bonded closure edge 64 (FIG. 5) of the final trailing edge extension 40 conforms to the shape of the trailing edge 28 regardless of placement of the inboard edges 44, 54 of the respective strip members 42, 52.

Referring to FIG. 7, it should be appreciated that the trailing edge extension 40 may incorporate additional functionalities. For example, the edge extension 40 may incorporate noise-reduction structural members 70 defined in the extension sections 50, 60. In a particular embodiment illustrated in FIG. 7, these noise reduction members 70 may be defined as individual serrations 72.

As mentioned, the present invention also encompasses various methods for forming an edge extension 40 on a wind turbine rotor blade 16. The method may include attaching a first strip member 42 to a pressure side shell member 22 along the trailing edge 28 of the blade such that a span-wise extension section 50 of the first tape member 42 defines an extension section in the chord-wise aspect beyond the trailing edge 28. Likewise, a second strip member is attached to the suction side shell member 24 along the trailing edge 28 of the blade such that a span-wise section of the second tape member 52 defines an extension section 60 that projects chord-wise beyond the trailing edge 28. The respective extension sections 50, 60 are attached to each other such that the outboard edges 48, 58 of the respective extension sections define a bonded closure edge 64 of the trailing edge extension 40.

The method may include applying the first and second strip members 42, 52 to the pressure and suction side shell members 22, 24 in the form of adhesively-backed tape strips, wherein the strip members are cut to size from a roll of the tape. Alternatively, the method may include cutting the first and second strip members 42, 52 from planar sheets of a material, such as an adhesively-backed material.

A method embodiment may include adhering the first and second strip members 42, 52 directly to each other along the extension sections 50, 60 without intervening structural components. In this embodiment, the method includes selecting the materials for the first and second strip members 42, 52 to have the desired final thickness and rigidity for the edge extension 40.

In an alternative embodiment, the method may include structurally reinforcing the strip members 42, 52, at least along the extension sections 50, 60, by insertion of a stiffening member 66 between the extension sections 50, 60.

Various other method embodiments may include providing additional functionalities to the trailing edge extension 40. For example, any manner of noise reduction feature may be defined in the first and second strip members 42, 52 prior to attaching the strip members to the rotor blade 16. These noise-reduction features may be, for example, a serrated profile that is defined along the outboard edges 48, 58 of the respective strip members. Alternatively, the serrated profile or other noise-reduction structural features may be defined in the respective strip members after the strip members 42, 52 have been attached to the rotor blade shell members 22, 24.

For ease of transport and shipment of the rotor blades 16 to a wind turbine site, the method may include attaching the first and second strip members 42, 52 to the shell members 22, 24 at the wind turbine site.

Various method embodiments may further include providing the first and second strip members 42, 52 in a size (particularly in the chord-wise aspect) such that the strip members 42, 52 can be subsequently trimmed along a trim line 74 in order to contour the outboard bonded edge 64 to match the contours of the trailing edge 28 regardless of placement of the inboard edges 44, 54 of the strip members 42, 52.

As mentioned, the present invention also encompasses any manner of a wind turbine 10 (FIG. 1) that includes a plurality of rotor blade assemblies 16 mounted to a rotor hub 18, wherein any one or combination of the blades 16 includes a trailing edge extension 40 as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming an edge extension on a wind turbine rotor blade, the rotor blade having a pressure side shell member, a suction side shell member, a leading edge, and a trailing edge extending in a generally span-wise direction between a tip and a root, the method comprising;

attaching a first strip member to the pressure side shell member along the trailing edge of the blade such that a span-wise section of the first tape member defines an extension section that extends chord-wise beyond the trailing edge;

attaching a second strip member to the suction side shell member along the trailing edge of the blade such that a span-wise section of the second tape member defines an extension section that extends chord-wise beyond the trailing edge;

adhesively attaching the respective extension sections of the first and second strip members together such that outboard edges of the extension sections define a bonded closure edge;

finishing the bonded closure edge to achieve a desired outboard edge contour along the edge extension; and wherein the finishing comprises trimming a portion of the extension sections.

2. The method of claim 1, further comprising providing noise-reduction structural members along the extension sections.

3. The method of claim 2, wherein the noise-reduction structural members are defined in the first and second strip members prior to attaching the strip members to the rotor blade.

4. The method of claim 2, comprising defining the noise-reduction structural members in the extension sections subsequent to attaching the first and second strip members to the rotor blade.

5. The method of claim 4, comprising defining a serrated profile along the outboard edges of the extension sections.

6. The method of claim 1, comprising attaching the first and second strip members to the rotor blade at a wind turbine site.

7. The method of claim 1, wherein said first and second strip members comprise adhesively-backed tape strips.

8. The method of claim 1, wherein said first and second strip members are directly adhered to each other along said extension sections without intervening structural components.

9. The method of claim 1, further comprising a stiffening strip member disposed between said first and second strip members along said extension sections.

10. The method of claim 9, wherein said stiffening strip member is adhesively attached to said first and second strip members and unattached to said trailing edge.

11. The method of claim 9, wherein said stiffening strip member is attached to either or both of said pressure side or said suction side along said trailing edge.

12. The method of claim 11, wherein said stiffening strip further comprises a plurality of pressure side attachment tabs and suction side attachment tabs spaced along an inboard edge thereof.

13. The method of claim 11, wherein said stiffening strip comprises a fiber reinforced material, wherein fibers in said material are oriented at an angle of generally 45° relative to an outboard edge said edge extension.

* * * * *